US008825603B2

(12) United States Patent
Harris, Jr. et al.

(10) Patent No.: US 8,825,603 B2
(45) Date of Patent: Sep. 2, 2014

(54) ORDERING VOLUMES AND TRACKS FOR DATA TRANSFER BASED ON USAGE CHARACTERISTICS

(75) Inventors: Theodore Timothy Harris, Jr., Tucson, AZ (US); Paul Anthony Jennas, II, Tucson, AZ (US); Jason L. Peipelman, Vail, AZ (US); Joshua Marshall Rhoades, Idaho Falls, ID (US); Matthew J. Ward, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 416 days.

(21) Appl. No.: 12/783,231

(22) Filed: May 19, 2010

(65) Prior Publication Data
US 2011/0289059 A1    Nov. 24, 2011

(51) Int. Cl.
*G06F 7/00* (2006.01)
*G06F 17/00* (2006.01)
*G06F 3/06* (2006.01)

(52) U.S. Cl.
CPC .............. *G06F 3/065* (2013.01); *G06F 3/0689* (2013.01)
USPC ............ 707/654; 707/634; 711/161; 711/162

(58) Field of Classification Search
CPC ...... G06F 3/0617; G06F 3/065; G06F 3/0689
USPC ............................ 707/634, 654; 711/161, 162
See application file for complete search history.

(56) References Cited

U.S. PATENT DOCUMENTS

| | | | |
|---|---|---|---|
| 5,881,311 A * | 3/1999 | Woods | 710/4 |
| 6,804,755 B2 * | 10/2004 | Selkirk et al. | 711/165 |
| 7,581,061 B2 | 8/2009 | Myagaki et al. | |
| 2002/0069320 A1 * | 6/2002 | Yagi et al. | 711/112 |
| 2005/0027819 A1 * | 2/2005 | Nakano et al. | 709/217 |
| 2006/0236051 A1 * | 10/2006 | Haruma et al. | 711/162 |
| 2007/0136395 A1 * | 6/2007 | Fries et al. | 707/204 |
| 2007/0192386 A1 * | 8/2007 | Fries et al. | 707/204 |
| 2007/0233981 A1 * | 10/2007 | Arakawa et al. | 711/162 |
| 2008/0059718 A1 * | 3/2008 | Tajima et al. | 711/148 |
| 2008/0250083 A1 * | 10/2008 | Kovacs et al. | 707/204 |
| 2008/0320220 A1 | 12/2008 | Tsuboki et al. | |
| 2009/0043979 A1 * | 2/2009 | Jarvis | 711/162 |
| 2009/0228655 A1 | 9/2009 | Yamane | |
| 2010/0077142 A1 * | 3/2010 | Fienblit et al. | 711/118 |
| 2010/0138391 A1 * | 6/2010 | Namikawa et al. | 707/640 |

* cited by examiner

*Primary Examiner* — Shew-Fen Lin
(74) *Attorney, Agent, or Firm* — Rabindranath Dutta; Konrad Raynes Davda & Victor LLP

(57) ABSTRACT

A data transfer application implemented in a computational device receives a request to copy a plurality of storage volumes that form a consistency group. A determination is made that a first storage volume of the plurality of storage volumes is more likely to be written into than a second storage volume of the plurality of storage volumes, in response to receiving the request to copy the plurality of storage volumes. The first storage volume is copied before copying the second storage volume, in response to determining that the first storage volume is more likely to be written into than the second storage volume.

15 Claims, 6 Drawing Sheets

ORDERING VOLUMES AND TRACKS FOR DATA TRANSFER BASED ON USAGE CHARACTERISTICS

BACKGROUND

1. Field

The disclosure relates to a method, a system, and a computer program product for ordering volumes and tracks for data transfer based on usage characteristics of the volumes and tracks.

2. Background

Information technology systems, including storage systems, may provide features for data migration, data backup, or data duplication. Implementations for data migration, data backup, and data duplication may include mirroring or copying of data that is stored in storage volumes of storage systems. Such mirroring or copying of data stored in storage volumes may involve interactions among servers, clients, storage systems and networking components of the information technology system.

A consistency group is a group of storage volumes that need to be kept in a consistent state with each other, wherein the storage volumes may also be referred to as volumes. To provide a non-limiting example, a first command copies volume A1 to B1 and a second command copies volume A2 to B2. It is required that volumes B1 and B2 should represent a consistent state of the dataset in volumes A1 and A2 at a certain point in time. In a certain sequence of operations on the volumes the following set of dependent write operations may occur (where the second operation occurs after the first operation):

1. Write to dataset on volume A1 (data updated)
2. Write to dataset on volume A2 (data updated).

When volumes A1 and A2 are copied to volumes B1 and B2 respectively, then the following non-limiting example of a sequence of operations may create an inconsistent state in volumes B1, B2 with respect to volumes A1, A2:

1. Copy volume A1 to volume B1
2. Write to dataset on volume A1 (data updated)
3. Write to dataset on volume A2 (data updated)
4. Copy volume A2 to volume B2.

At the conclusion of all the copy operations, i.e., the conclusion of the fourth operation, volume B2 contains the data update of volume A2 whereas volume B1 does not contain the data update of volume A1. The set of volumes B1, B2 are in an inconsistent state with respect to the set of volumes A1, A2. An application that uses the volumes B1, B2 could not recover from a back-up copy stored in the volumes B1, B2.

Quiescing, i.e., suspending the operation, of the write application that writes to the dataset before performing the copy operations may ensure consistency of the volumes being copied. In certain other implementations if a new write operation is requested while a consistency group is being formed then the new write operation is prevented from being executed until all the volumes are copied over.

In certain data replication mechanisms, volumes (e.g., volumes A1 and A2) are grouped into consistency groups. A consistency group is a group of volumes that are kept in a consistent state with each other. For example, volumes A1 and A2 may form a consistency group. A consistency group is then copied over to a remote location. For example, volumes A1 and A2 may be copied into volumes B1 and B2 respectively at the remote location. Each volume of the consistency group may comprise a plurality of tracks. If a write request arrives for a track that still needs to be copied to the remote location then a collision may occur and the track may have to be copied over before the write request is permitted to write to the track. Collisions affect system performance as the write operation is not allowed to complete until the track is copied to the remote site.

SUMMARY OF THE PREFERRED EMBODIMENTS

Provided are a method, a system, and a computer program product, in which a data transfer application implemented in a computational device receives a request to copy a plurality of storage volumes that form a consistency group. A determination is made that a first storage volume of the plurality of storage volumes is more likely to be written into than a second storage volume of the plurality of storage volumes, in response to receiving the request to copy the plurality of storage volumes. The first storage volume is copied before copying the second storage volume, in response to determining that the first storage volume is more likely to be written into than the second storage volume.

In additional embodiments, the first storage volume has a plurality of tracks. A first track of the plurality of tracks of the first storage volume is copied before copying a second track of the plurality of tracks of the first storage volume, in response to determining that the first track is more likely to be written into than the second track. Any write operation on the first track is suspended until the first track has been completely copied. Any write operation on the second track is suspended until the second track has been completely copied.

In yet additional embodiments, a usage statistics generator application stores in a data structure, information on how frequently each of the plurality of storage volumes and each of the plurality of tracks have been written into prior to receiving the request to copy the plurality of storage volumes that form the consistency group. A determination is made that the first storage volume of the plurality of storage volumes is more likely to be written into than the second storage volume of the plurality of storage volumes if the data structure indicates that the first storage volume has been written into more frequently than the second storage volume prior to receiving the request to copy the plurality of storage volumes that form the consistency group. A further determination is made that the first track is more likely to be written into than the second track if the data structure indicates that the first track has been written into more frequently than the second track prior to receiving the request to copy the plurality of storage volumes that form the consistency group.

In further embodiments, the computational device is a first computational device, wherein a second computational device is coupled to the first computational device, wherein the second computational device is separated by a distance of at least one kilometer from the first computational device. The first and second storage volumes are copied from the first computational device to the second computational device, wherein the copying of the first storage volume before the copying of the second storage volume reduces data collisions at the first computational device in comparison to copying the second storage volume before copying the first storage volume. The usage statistics generator application is implemented in the first computational device.

In yet further embodiments, a subdivisional unit type of the first storage volume is selected, wherein the subdivisional unit type of the first storage volume is selected from an extent, a segment, a block and a file. Data is stored in a first subdivisional unit and a second subdivisional unit of the first storage volume, wherein the first subdivisional unit and the second subdivisional unit are of the selected subdivisional unit type. The first subdivisional unit of the plurality of subdivisional units of the first storage volume is copied before copying the second subdivisional unit of the plurality of subdivisional units of the first storage volume, in response to determining that the first subdivisional unit is more likely to be written into than the second subdivisional unit. Any write operation on the first subdivisional unit is suspended until the first subdivisional unit has been completely copied. Any write operation on the second subdivisional unit is suspended until the second subdivisional unit has been completely copied.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Certain embodiments incorporate the likelihood of write operations on storage volumes and tracks of storage volumes in order to determine an order in which the storage volumes and the tracks are to be copied while consistent copying of storage volumes are being performed. In certain embodiments, storage volumes and tracks that are more likely to be written into in comparison to other storage volumes and other tracks may be copied before other storage volumes and the other tracks. Collisions may be reduced during data transfer and system input/output (I/O) performance may be enhanced.

Exemplary Embodiments

Figure 1:
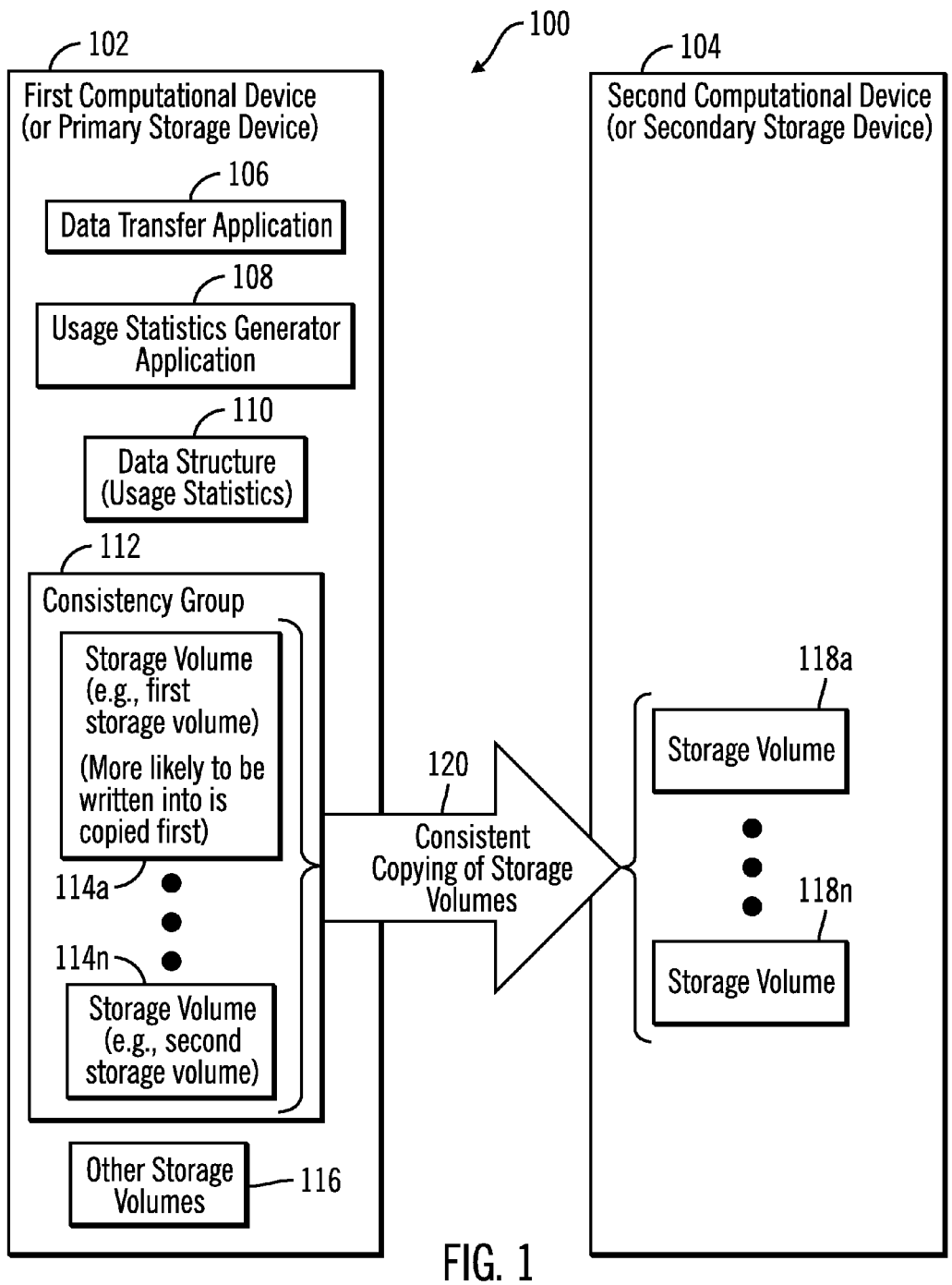
FIG. 1 illustrates a block diagram of a computing environment that includes a first computational device coupled to a second computational device, wherein consistent copying of storage volumes is performed in accordance with certain embodiments.

FIG. 1 illustrates a block diagram of a computing environment 100 that includes a first computational device 102 coupled to a second computational device 104, wherein consistent copying of storage volumes is performed in accordance with certain embodiments. The first computational device 102 and the second computational device 104 may comprise any suitable computational device, including those presently known in the art, such as, a personal computer, a workstation, a server, a mainframe, a hand held computer, a palm top computer, a telephony device, a network appliance, a blade computer, a storage server, a storage controller, etc. In certain embodiments the first computational device 102 may comprise a primary storage device and the second computational device 104 may comprise a secondary storage device. In additional embodiments, the first computational device 102 is separated by an extended distance (e.g., at least one kilometer) from the first computational device, The first computational device 102 includes a data transfer application 106, a usage statistics generator application 108, a data structure 110 for maintaining usage statistics of storage volumes and tracks, a consistency group 112 having a plurality of storage volumes 114a . . . 114n, and other storage volumes 116. The second computational device 104 includes a plurality of storage volumes 118a . . . 118n that are consistent copies generated by consistent copying (shown via reference numeral 120) of the storage volumes 114a . . . 114n of the consistency group 112 from the first computational device 102 to the second computational device 104. The storage volumes 114a . . . 114n, 118a . . . 118n may comprise logical volumes that are logical representations corresponding to one or more physical volumes maintained by the first computational device 102 and the second computational device 104.

In certain alternative embodiments, the data transfer application 106 and the usage statistics generator application 108 may be combined into a single application. In other embodiments, the storage volumes 118a . . . 118n that are consistent copies of the storage volumes 114a . . . 114n of the consistency group 112 may also be stored in the computational device 102 instead of being stored in the second computational device 104.

In certain embodiments, the first computational device 102 may comprise a local site and the second computational device 104 may comprise a remote site. While FIG. 1 shows the storage volumes 114a . . . 114n in the first computational device only, in certain alternative embodiments, the storage volumes 114a . . . 114n shown in the first computational device 102 may be distributed among a plurality of storage controllers that operate in coordination with each other.

In an exemplary embodiment illustrated in FIG. 1, the storage volume 114a may be referred to as an exemplary first storage volume and the storage volume 114n may be referred to as an exemplary second storage volume. The usage statistics generator application 108 may determine from usage statistics information stored in the data structure 110 that the exemplary first storage volume 114a is more likely to be written into than the exemplary second storage volume 114n (i.e., a request for writing data to the first storage volume 114a is more likely to arrive than a request for writing data to the second storage volume 114n). Based on the determination, the data transfer application 106 copies the exemplary first storage volume 114a from the first computational device 102 to the second computational device 104, prior to copying the exemplary second storage volume 114n from the first computational device 102 to the second computational device 104. In additional embodiments, the plurality of storage volumes 114a . . . 114n may be ordered based on the likelihood of being written into, and the storage volumes that are more likely to be written into are copied before storage volumes that are less likely to be written into while the consistency group 112 is being copied over from the first computational device 102 to the second computational device 104. As a result, there is lesser likelihood of collisions caused by the arrival of write requests at the first computational device 102.

Figure 2:
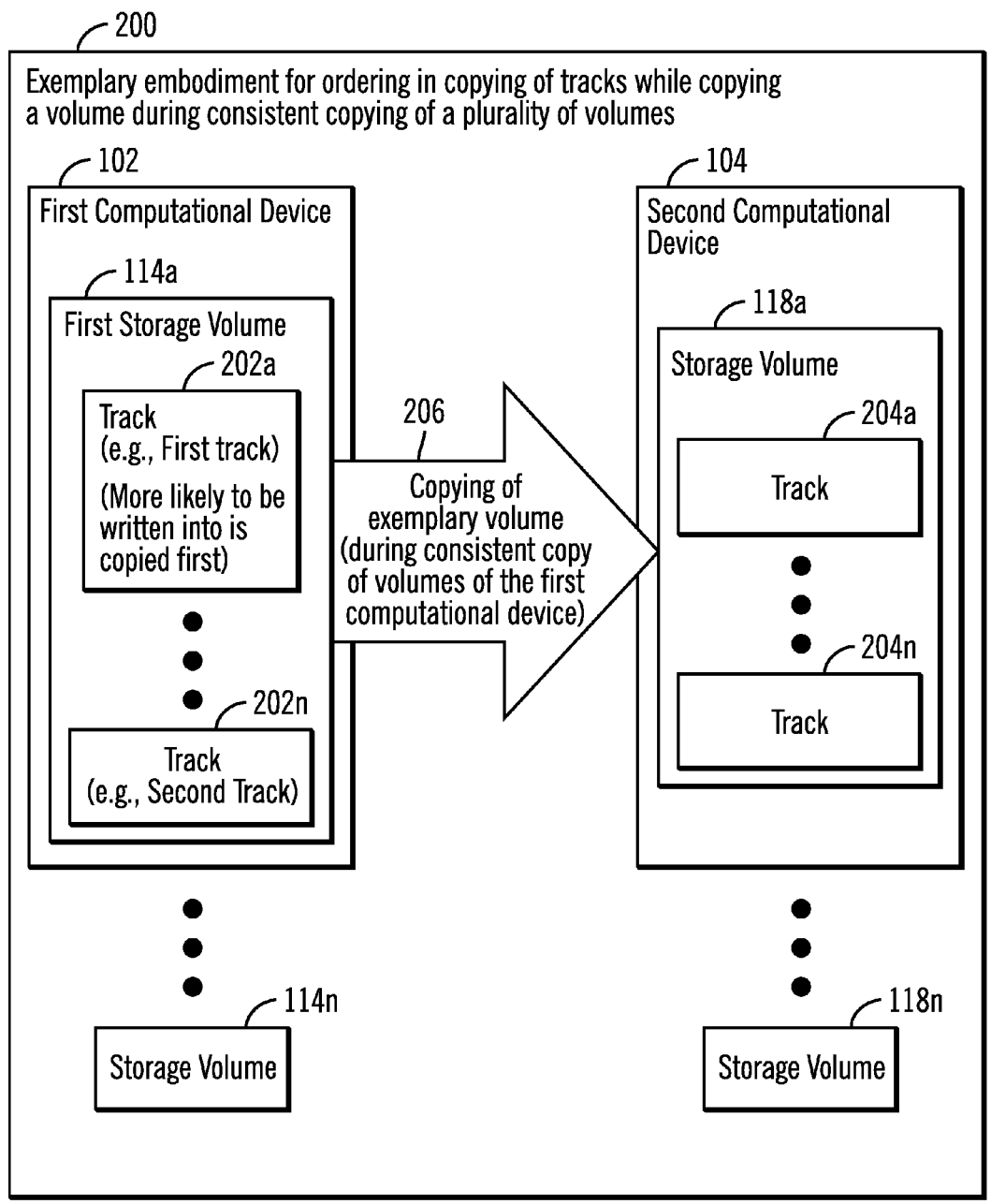
FIG. 2 illustrates a block diagram of an exemplary embodiment in which tracks within a storage volume are ordered for copying while the storage volume is being copied from a first computational device to a second computational device, in accordance with certain embodiments.

FIG. 2 illustrates a block diagram 200 of an exemplary embodiment in which tracks 202a . . . 202n within the exemplary first storage volume 114a are ordered for copying while the first storage volume 114a is being copied from the first computational device 102 to the second computational device 104, in accordance with certain embodiments. The tracks 202a . . . 202n for the first storage volume 114a may be copied to the storage volume 118a that has a plurality of tracks 204a . . . 204n.

In FIG. 1 it was shown that storage volumes may be ordered based on the likelihood of being written into, and storage volumes that are more likely to be written into are copied before copying other storage volumes. However, in certain embodiments a storage volume may have a plurality of tracks, and some tracks may be more likely to be written into than other tracks. In such situations, while copying a storage volume tracks that are more likely to be written into are copied before other tracks.

For example, the first storage volume 114a may comprise a plurality of tracks 202a . . . 202n. In certain embodiments, the usage statistics generator application 108 may determine from the usage statistics stored in the data structure 110 that an exemplary first track 202a is more likely to be written into than an exemplary second track 202n. In such a situation, the first track 202a is copied from the first computational device 102 to the second computational device 104 before copying the second track 202n from the first computational device 102 to the second computational device 104.

FIG. 2 shows that by copying tracks that are more likely to be written into before other tracks, the possibility of collisions caused by the arrival of write requests is reduced while consistent copying (shown via reference numeral 206) is being performed of storage volumes from the first computational device 102 to the second computational device 104.

Figure 3:
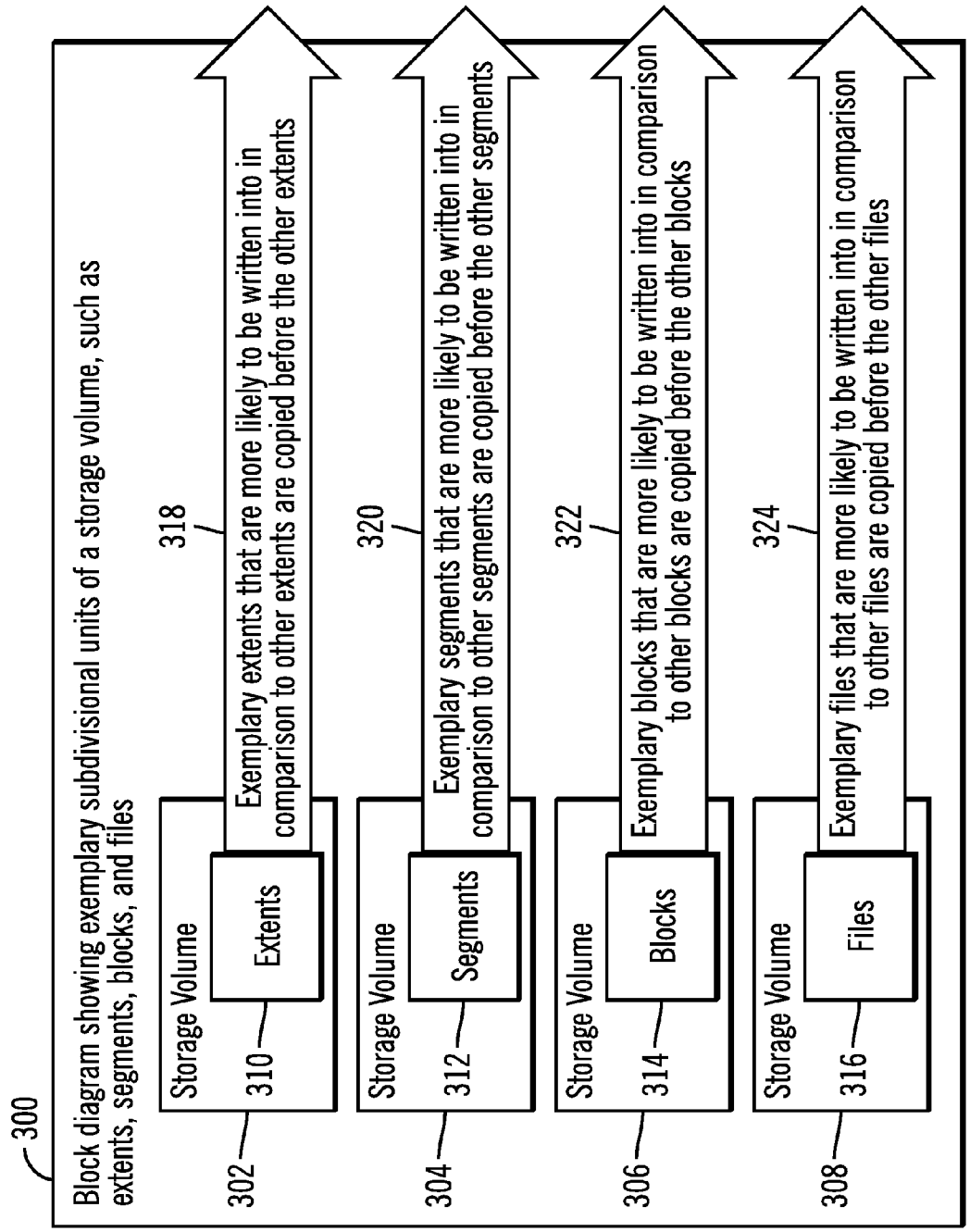
FIG. 3 illustrates a block diagram that shows exemplary subdivisional units of a storage volume, such as extents, segments, blocks, and files, in accordance with certain embodiments.

FIG. 3 illustrates a block diagram 300 showing exemplary subdivisional units of a storage volume (e.g., storage volumes 302, 304, 306, 308), such as, extents 310, segments 312, blocks 314, and files 316, in accordance with certain embodiments. Other subdivisional units of storage volumes may also be used in alternative embodiments.

In FIG. 2 it was shown that storage volumes may have tracks. FIG. 3 shows that instead of tracks storage volumes may have extents, segments, blocks, or files. In embodiments in which storage volumes have extents 310, exemplary extents that are more likely to be written into in comparison to other extents are copied from the first computational device 102 to the second computational device 104 before the other extents (reference numeral 318). In embodiments in which storage volumes have segments 312, exemplary segments that are more likely to be written into in comparison to other segments are copied from the first computational device 102 to the second computational device 104 before the other segments (reference numeral 320). In embodiments in which storage volumes have blocks 314, exemplary blocks that are more likely to be written into in comparison to other blocks are copied from the first computational device 102 to the second computational device 104 before the other blocks (reference numeral 322). In embodiments in which storage volumes have files 316, exemplary files that are more likely to be written into in comparison to other files are copied from the first computational device 102 to the second computational device 104 before the other files (reference numeral 324).

FIG. 3 shows that in certain embodiments, a subdivisional unit type of the first storage volume is selected, wherein the subdivisional unit type of the first storage volume is selected from an extent 310, a segment 312, a block 314 and a file 316. Data is stored in a first subdivisional unit (e.g., a first extent) and a second subdivisional unit (e.g., a second extent) of a first storage volume, wherein the first subdivisional unit and the second subdivisional unit are of the selected subdivisional unit type (e.g., extent). The first subdivisional unit of the plurality of subdivisional units of the first storage volume is copied before copying the second subdivisional unit of the plurality of subdivisional units of the first storage volume, in response to determining that the first subdivisional unit is more likely to be written into than the second subdivisional unit. Any write operation on the first subdivisional unit is suspended until the first subdivisional unit has been completely copied. Any write operation on the second subdivisional unit is suspended until the second subdivisional unit has been completely copied.

Figure 4:
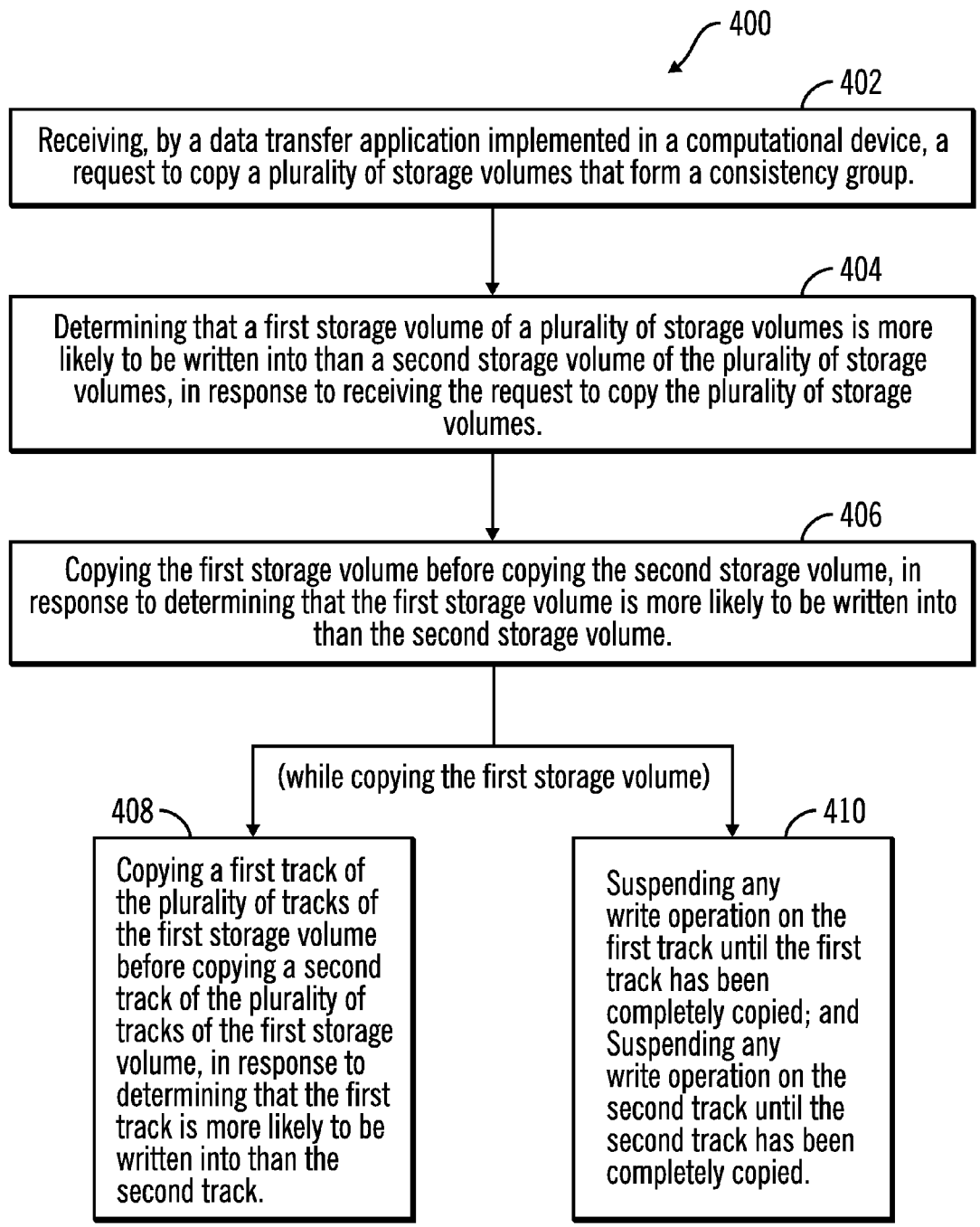
FIG. 4 illustrates a first flowchart that shows how storage volumes and tracks are ordered while performing consistent copying of a consistency group, in accordance with certain embodiments.

FIG. 4 illustrates a first flowchart 400 that shows how storage volumes 114a . . . 114n and tracks 202a . . . 202n are ordered while consistent copying a consistency group 112, in accordance with certain embodiments. The operations shown in the first flowchart may be performed by the data transfer application 106 implemented in the first computational device 102.

Control starts at block 402 in which the data transfer application 106 implemented in a computational device 102 receives a request to copy a plurality of storage volumes 114a . . . 114n that form a consistency group 112.

Control proceeds to block 404 in which a determination is made that a first storage volume 114a of the plurality of storage volumes 114a . . . 114n is more likely to be written into than a second storage volume 114n of the plurality of storage volumes 114a . . . 114n, in response to receiving the request to copy the plurality of storage volumes 114a . . . 114n. The first storage volume 114a is copied (at block 406) before copying the second storage volume 114n, in response to determining that the first storage volume 114a is more likely to be written into than the second storage volume 114n.

The operations shown in blocks 408 and 410 are performed while the operations shown in block 406 (i.e., the copying of the first storage volume 114a) is being performed. The first storage volume 114a has a plurality of tracks 202a . . . 202n. A first track 202a of the plurality of tracks 202a . . . 202n of the first storage volume 114a is copied (at block 408) before copying a second track 202n of the plurality of tracks 202a . . . 202n of the first storage volume 114a, in response to determining that the first track 202a is more likely to be written into than the second track 202n. Any write operation on the first track 202a is suspended (at block 410) until the first track 202a has been completely copied. Any write operation on the second track 202n is suspended (also at block 410) until the second track 202n has been completely copied.

Therefore, FIG. 4 illustrates certain embodiments in which storage volumes and tracks are ordered based on the likelihood of the storage volumes and tracks being written into, and those storage volumes and tracks that are more likely to be written into in comparison to other storage volumes and tracks are copied over before the other storage volumes and tracks while consistent copying is being performed.

Figure 5:
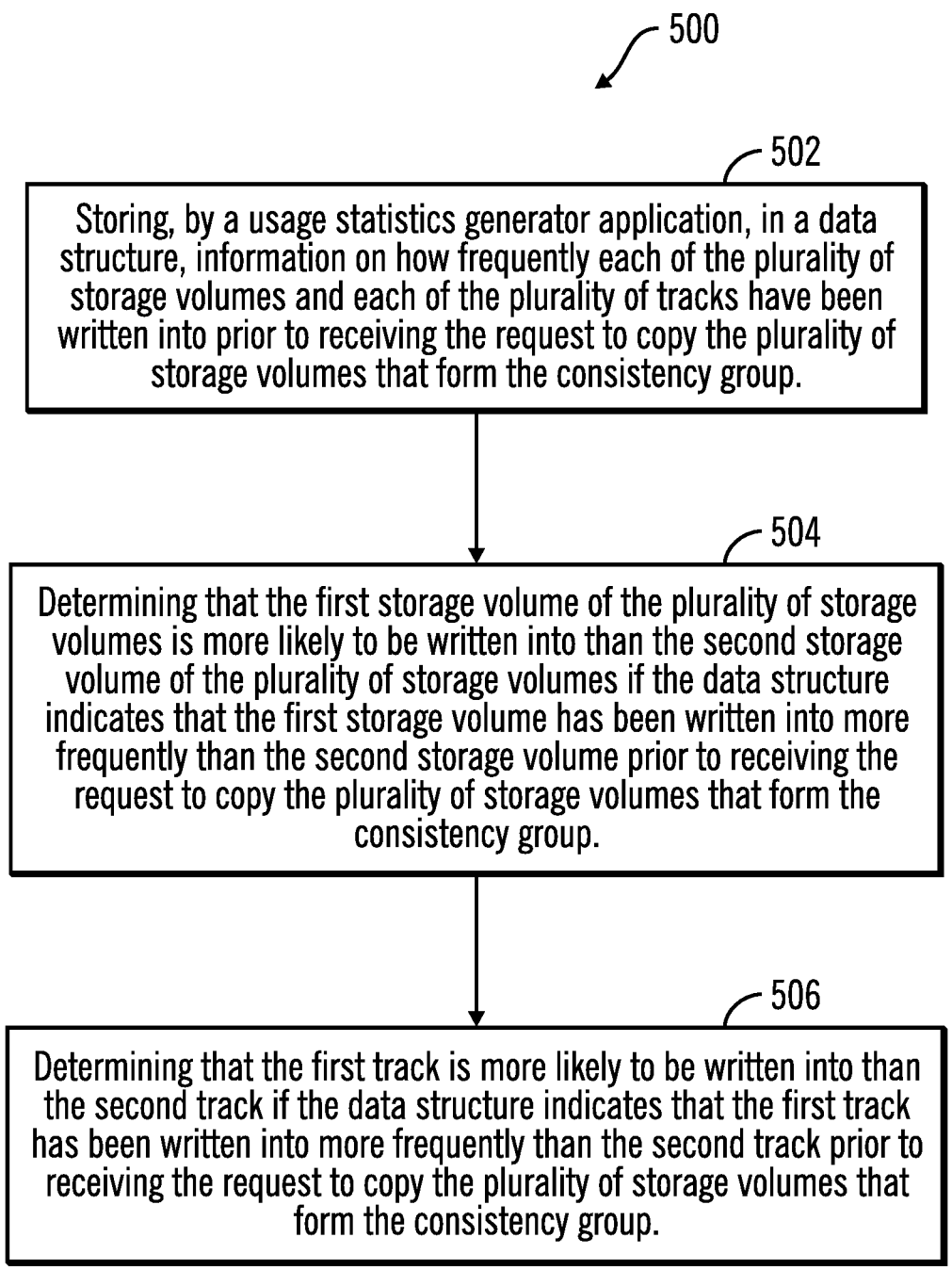
FIG. 5 illustrates a second flowchart that shows how a usage statistics generator application performs operations, in accordance with certain embodiments.

FIG. 5 illustrates a second flowchart 500 that shows how the usage statistics generator application 108 implemented in the first computational device 102 performs operations, in accordance with certain embodiments;

Control starts at block 502 in which the usage statistics generator application 108 stores in a data structure 110, information on how frequently each of the plurality of storage volumes 114a . . . 114n and each of the plurality of tracks 202a . . . 202n have been written into prior to receiving a request to copy the plurality of storage volumes 114a . . . 114n that form the consistency group 112, A determination is made (at block 504) that the first storage volume 114a of the plurality of storage volumes 114a . . . 114n is more likely to be written into than the second storage volume 114n of the plurality of storage volumes 114a . . . 114n if the data structure 110 indicates that the first storage volume 114a has been written into more frequently than the second storage volume 114n prior to receiving the request to copy the plurality of storage volumes 114a , , , 114n that form the consistency group 112.

A further determination is made (at block 506) that a first track 202a is more likely to be written into than a second track 202n if the data structure 110 indicates that the first track 202a has been written into more frequently than the second track 202n prior to receiving the request to copy the plurality of storage volumes 114a . . . 114n that form the consistency group 112.

The operations performed by the usage statistics generator application 108 in blocks 502, 504, 506 of FIG. 5 allow the data transfer application 106 to determine which storage volumes and tracks to transfer before other storage volumes and tracks as shown in FIG. 4.

In certain embodiments, the usage statistics generator application 108 continuously keeps on updating the data structures 110 to indicate the frequency with which each storage volume and each track is updated. The data structures 110 may maintain for each storage volume and track a numeric value that indicates how frequently the storage volumes and tracks have been used in the past, and the usage statistics generator application 108 may determine that the storage volumes and tracks that have been used more frequently in the past in comparison to other storage volumes and tracks are more likely to be used more frequently in the future. In certain embodiments, in order to restrict the voluminous amount of usage statistics that may be generated, the usage statistics may be maintained for groups of tracks rather than for each track. Other mechanisms for maintaining usage statistics may be used in alternative embodiments.

The embodiments shown in FIGS. 1-5 may reduce the number of collisions and increase system I/O performance by transferring more likely to be written into storage volumes and tracks during consistent copying of storage volumes and tracks of a consistency group.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied there.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java*, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Java is a trademark or registered trademark of Sun Microsystems, Inc.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
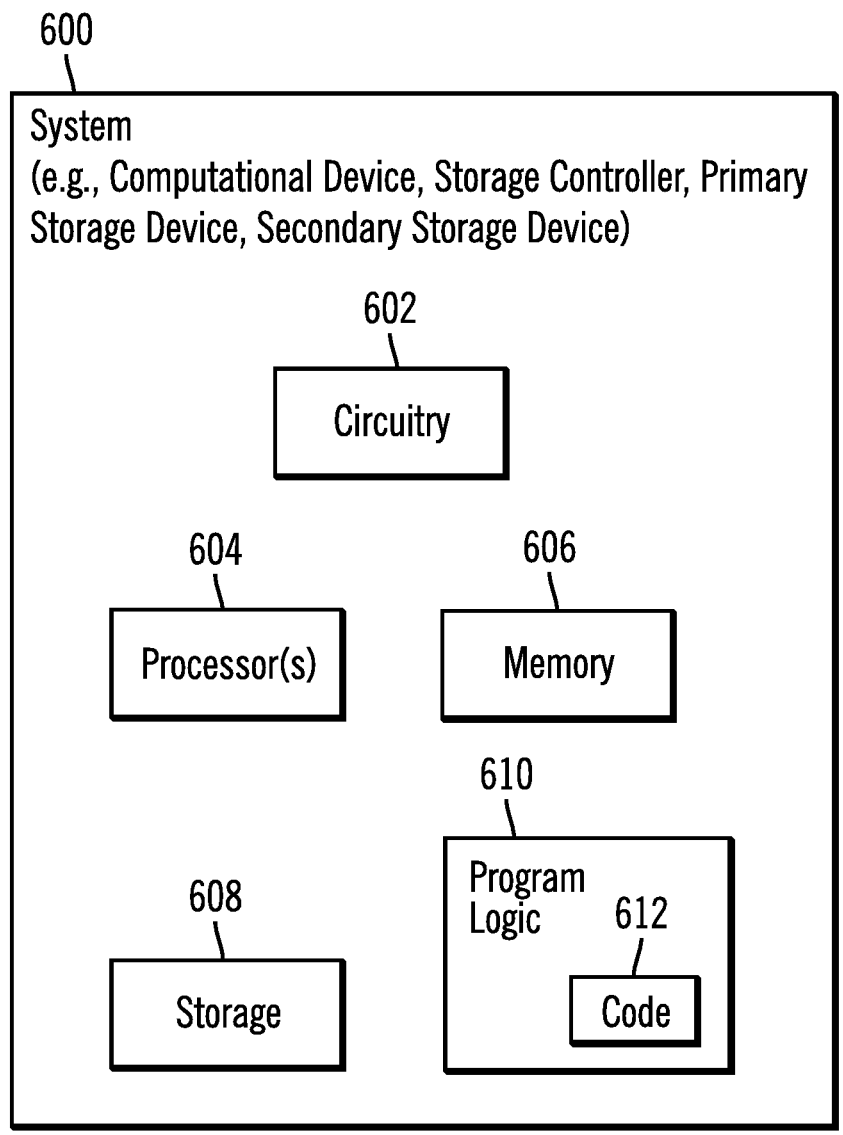
FIG. 6 illustrates a block diagram of a computational system that shows certain elements that may be included in the first and second computational devices of FIG. 1, in accordance with certain embodiments.

FIG. 6 illustrates a block diagram that shows certain elements that may be included in the system 600 in accordance with certain embodiments. The system 600 may comprise the first computational device 102 or the second computational device 104 and may include a circuitry 602 that may in certain embodiments include at least a processor 604. The system 600 may also include a memory 606 (e.g., a volatile memory device), and storage 608. The storage 608 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 608 may comprise an internal storage device, an attached storage device and/or a network accessible storage device. The system 600 may include a program logic 610 including code 612 that may be loaded into the memory 606 and executed by the processor 604 or circuitry 602. In certain embodiments, the program logic 610 including code 612 may be stored in the storage 608. In certain other embodiments, the program logic 610 may be implemented in the circuitry 602. Therefore, while FIG. 6 shows the program logic 610 separately from the other elements, the program logic 610 may be implemented in the memory 606 and/or the circuitry 602.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:

receiving, by a data transfer application implemented in a first computational device, a request to copy a plurality of storage volumes that form a consistency group, wherein in the consistency group, dependent write operations do not generate an inconsistent state for a dataset stored in the plurality of storage volumes having a plurality of tracks, wherein a data structure maintains statistics information on how frequently the plurality of storage volumes and the plurality of tracks have been written into;

determining that a first storage volume of the plurality of storage volumes is more likely to be written into than a second storage volume of the plurality of storage volumes if the data structure indicates that the first storage volume has been written into more frequently than the second storage volume prior to receiving the request to copy the plurality of storage volumes, in response to receiving the request to copy the plurality of storage volumes, wherein the first storage volume has a first plurality of tracks, and wherein the second storage volume has second plurality of tracks;

subsequent to determining that the first storage volume is more likely to be written into than the second storage volume, determining that a first track of the first plurality of tracks of the first storage volume is more likely to be written into than a second track of the first plurality of tracks of the first storage volume, wherein the first track is more likely to be written into than the second track if the data structure indicates that the first track has been written into more frequently than the second track prior to receiving the request to copy the plurality of storage volumes;

suspending write operations on the first track, and subsequent to suspending the write operations on the first track, copying the first track from the first computational device to a second computational device;

subsequent to copying the first track from the first computational device to the second computational device, suspending write operations on the second track and copying the second track from the first computational device to the second computational device; and subsequent to copying all tracks of the first plurality of tracks of the first storage volume from the first computational device to the second computational device, copying the second plurality of tracks of the second storage volume from the first computational device to the second computational device.

2. The method of claim 1, the method further comprising:

selecting a subdivisional unit type of the first storage volume, wherein the subdivisional unit type of the first storage volume is selected from an extent, a segment, a block and a file;

storing data in a first subdivisional unit and a second subdivisional unit of the first storage volume, wherein the first subdivisional unit and the second subdivisional unit are of the selected subdivisional unit type;

copying the first subdivisional unit of the plurality of subdivisional units of the first storage volume before copying the second subdivisional unit of the plurality of subdivisional units of the first storage volume, in response to determining that the first subdivisional unit is more likely to be written into than the second subdivisional unit;

suspending any write operation on the first subdivisional unit until the first subdivisional unit has been completely copied; and suspending any write operation on the second subdivisional unit until the second subdivisional unit has been completely copied.

3. The method of claim 1, wherein an entirety of the first storage volume is copied from the first computational device to the second computational device prior to starting copying of the second storage volume from the first computational device to the second computational device.

4. The method of claim 1, the method further comprising:
maintaining in the data structure in the first computational device, for each storage volume and for each track, a numeric value that indicates how frequently each storage volume and each track have been used in the past.

5. The method of claim 4, wherein a usage statistics generator application in the first computational device updates the data structure to indicate the frequency of updates of each storage volume and each track.

6. A system comprising a first computational device, wherein the system comprising the first computational device is coupled to a second computational device, the system comprising:
a memory; and
a processor coupled to the memory, wherein the processor performs operations, the operations comprising:
receiving, by a data transfer application implemented in the first computational device, a request to copy a plurality of storage volumes that form a consistency group wherein in the consistency group, dependent write operations do not generate an inconsistent state for a dataset stored in the plurality of storage volumes having a plurality of tracks, wherein a data structure maintains statistics information on how frequently the plurality of storage volumes and the plurality of tracks have been written into;

determining that a first storage volume of the plurality of storage volumes is more likely to be written into than a second storage volume of the plurality of storage volumes if the data structure indicates that the first storage volume has been written into more frequently than the second storage volume prior to receiving the request to copy the plurality of storage volumes, in response to receiving the request to copy the plurality of storage volumes, wherein the first storage volume has a first plurality of tracks, and wherein the second storage volume has second plurality of tracks;

subsequent to determining that the first storage volume is more likely to be written into than the second storage volume, determining that a first track of the first plurality of tracks of the first storage volume is more likely to be written into than a second track of the first plurality of tracks of the first storage volume, wherein the first track is more likely to be written into than the second track if the data structure indicates that the first track has been written into more frequently than the second track prior to receiving the request to copy the plurality of storage volumes;

suspending write operations on the first track, and subsequent to suspending the write operations on the first track, copying the first track from the first computational device to a second computational device;

subsequent to copying the first track from the first computational device to the second computational device, suspending write operations on the second track and copying the second track from the first computational device to the second computational device; and subsequent to copying all tracks of the first plurality of tracks of the first storage volume from the first computational device to the second computational device, copying the second plurality of tracks of the second storage volume from the first computational device to the second computational device.

7. The system of claim 6, the operations further comprising:

selecting a subdivisional unit type of the first storage volume, wherein the subdivisional unit type of the first storage volume is selected from an extent, a segment, a block and a file;

storing data in a first subdivisional unit and a second subdivisional unit of the first storage volume, wherein the first subdivisional unit and the second subdivisional unit are of the selected subdivisional unit type;

copying the first subdivisional unit of the plurality of subdivisional units of the first storage volume before copying the second subdivisional unit of the plurality of subdivisional units of the first storage volume, in response to determining that the first subdivisional unit is more likely to be written into than the second subdivisional unit;

suspending any write operation on the first subdivisional unit until the first subdivisional unit has been completely copied; and suspending any write operation on the second subdivisional unit until the second subdivisional unit has been completely copied.

8. The system of claim 6, wherein an entirety of the first storage volume is copied from the first computational device to the second computational device prior to starting copying of the second storage volume from the first computational device to the second computational device.

9. The system of claim 6, the operations further comprising:
maintaining in the data structure in the first computational device, for each storage volume and for each track, a numeric value that indicates how frequently each storage volume and each track have been used in the past.

10. The system of claim 9, wherein a usage statistics generator application in the first computational device updates the data structure to indicate the frequency of updates of each storage volume and each track.

11. A computer program product, the computer program product comprising:
a computer readable storage medium having computer readable program code embodied therewith, the computer readable program code configured to perform operations, the operations comprising:
receiving, by a data transfer application implemented in a first computational device, a request to copy a plurality of storage volumes that form a consistency group, wherein in the consistency group, dependent write operations do not generate an inconsistent state for a dataset stored in the plurality of storage volumes having a plurality of tracks, wherein a data structure maintains statistics information on how frequently the plurality of storage volumes and the plurality of tracks have been written into;
determining that a first storage volume of the plurality of storage volumes is more likely to be written into than a second storage volume of the plurality of storage volumes if the data structure indicates that the first storage volume has been written into more frequently than the second storage volume prior to receiving the request to copy the plurality of storage volumes, in response to receiving the request to copy the plurality of storage volumes, wherein the first storage volume has a first plurality of tracks, and wherein the second storage volume has second plurality of tracks;
subsequent to determining that the first storage volume is more likely to be written into than the second storage volume, determining that a first track of the first plurality of tracks of the first storage volume is more likely to be written into than a second track of the first plurality of tracks of the first storage volume, wherein the first track is more likely to be written into than the second track if the data structure indicates that the first track has been written into more frequently than the second track prior to receiving the request to copy the plurality of storage volumes;

suspending write operations on the first track, and subsequent to suspending the write operations on the first track, copying the first track from the first computational device to a second computational device;
subsequent to copying the first track from the first computational device to the second computational device, suspending write operations on the second track and copying the second track from the first computational device to the second computational device; and
subsequent to copying all tracks of the first plurality of tracks of the first storage volume from the first computational device to the second computational device, copying the second plurality of tracks of the second storage volume from the first computational device to the second computational device.

12. The computer program product of claim 11, the operations further comprising:
selecting a subdivisional unit type of the first storage volume, wherein the subdivisional unit type of the first storage volume is selected from an extent, a segment, a block and a file;
storing data in a first subdivisional unit and a second subdivisional unit of the first storage volume, wherein the first subdivisional unit and the second subdivisional unit are of the selected subdivisional unit type;
copying the first subdivisional unit of the plurality of subdivisional units of the first storage volume before copying the second subdivisional unit of the plurality of subdivisional units of the first storage volume, in response to determining that the first subdivisional unit is more likely to be written into than the second subdivisional unit;
suspending any write operation on the first subdivisional unit until the first subdivisional unit has been completely copied; and
suspending any write operation on the second subdivisional unit until the second subdivisional unit has been completely copied.

13. The computer program product of claim 11, wherein an entirety of the first storage volume is copied from the first computational device to the second computational device prior to starting copying of the second storage volume from the first computational device to the second computational device.

14. The computer program product of claim 11, the operations further comprising:
maintaining in the data structure in the first computational device, for each storage volume and for each track, a numeric value that indicates how frequently each storage volume and each track have been used in the past.

15. The computer program product of claim 14, wherein a usage statistics generator application in the first computational device updates the data structure to indicate the frequency of updates of each storage volume and each track.

* * * * *